United States Patent [19]

Vahrenkamp

[11] 4,113,274
[45] Sep. 12, 1978

[54] PNEUMATIC LIFT FOR SINGLE AXLE TRAILER

[76] Inventor: Oscar Oswald Vahrenkamp, 317 Sparks Dr., Grand Prairie, Tex. 75050

[21] Appl. No.: 743,607

[22] Filed: Nov. 22, 1976

[51] Int. Cl.² ............................................. B60D 1/14
[52] U.S. Cl. .................................... 280/475; 280/764
[58] Field of Search ............... 280/475, 477, 763, 764, 280/765, 766; 254/45

[56] References Cited

U.S. PATENT DOCUMENTS

| 3,844,582 | 10/1974 | Cook | 280/764 |
| 3,874,696 | 4/1975 | Gardner | 280/475 X |
| 3,976,284 | 8/1976 | Hupp | 280/475 |

FOREIGN PATENT DOCUMENTS

| 675,846 | 7/1952 | United Kingdom | 280/764 |

*Primary Examiner*—John A. Pekar

*Attorney, Agent, or Firm*—Hubbard, Thurman, Turner, Tucker & Glaser

[57] ABSTRACT

A pneumatic jack assembly is pivotally secured to the tongue of a single axle trailer to assist an operator in lifting the tongue for engagement with the coupling member of a tow truck. The jack assembly includes a ground-engaging strut pivotally secured to the tongue and a pneumatic power assembly transversely disposed with respect to the tongue. The power assembly includes a cylindrical housing for receiving compressed air and a piston operably coupled to the housing for transmitting a mechanical force in response to power derived from the compressed air. The housing is pivotally secured to the tongue and the piston is pivotally secured to the strut to permit rotational movement of the housing and tongue relative to each other and relative to the strut as the tongue is lifted by the force exerted by the piston. In a preferred embodiment, the penumatic power assembly derives its operating energy from a source of compressed air carried by the trailer.

8 Claims, 7 Drawing Figures

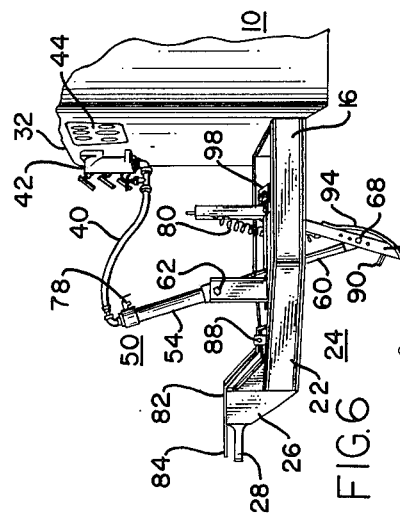
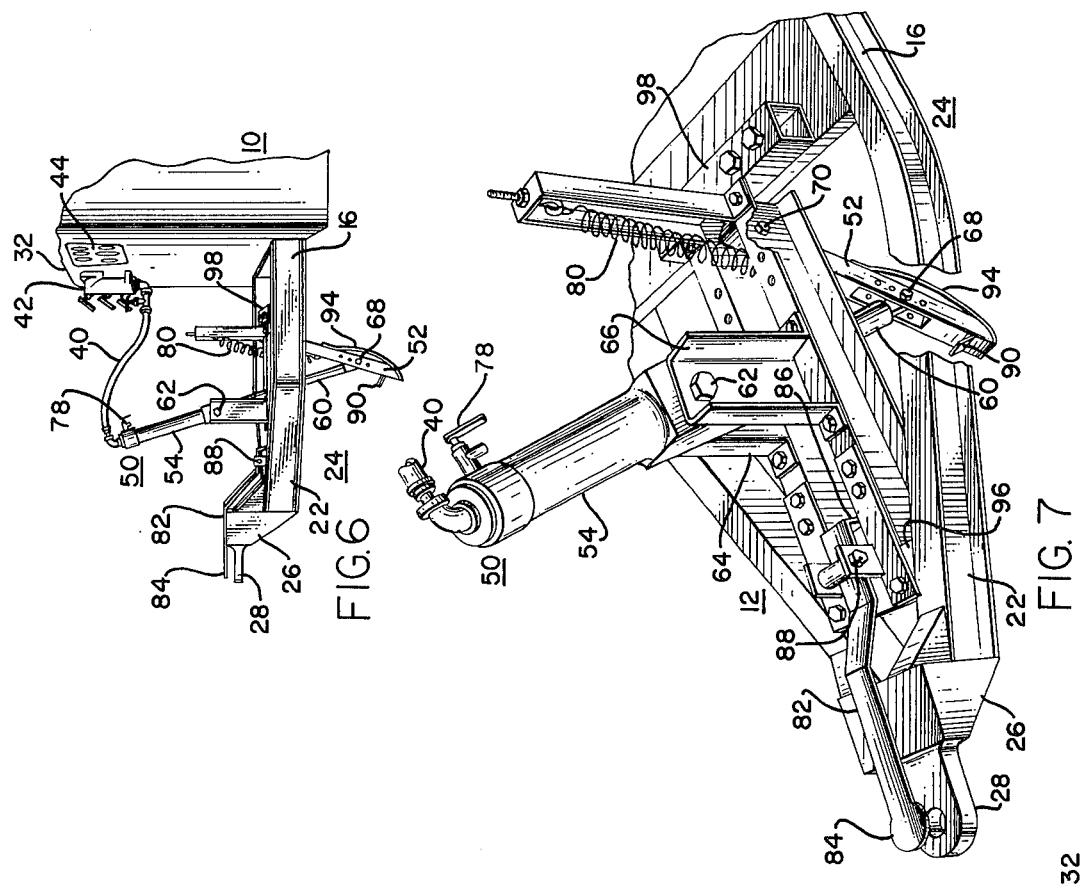
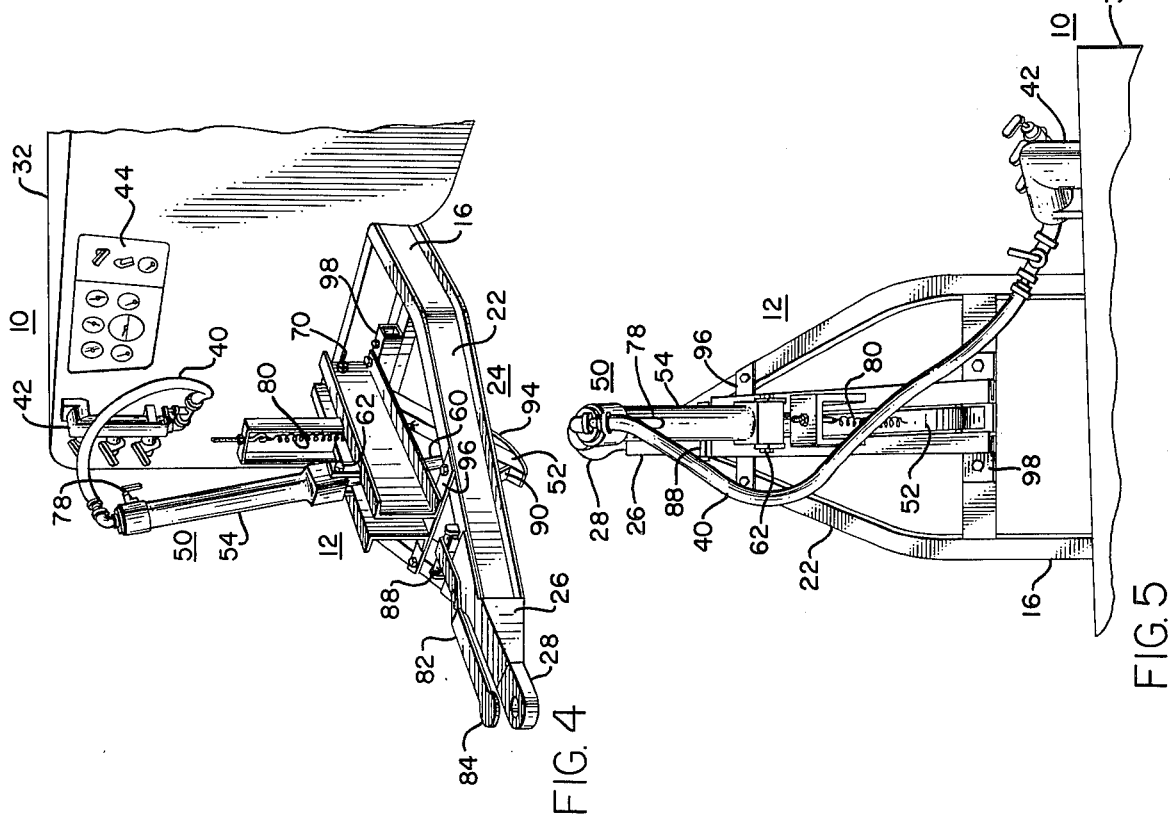

PNEUMATIC LIFT FOR SINGLE AXLE TRAILER

BACKGROUND OF THE INVENTION

1. Field of the Invention

The invention relates generally to trailer construction and in particular to a pneumatic lift system for a single axle utility trailer.

2. Description of the Prior Art

Single axle trailers are widely used to transport heavy loads. For example the single axle trailer is commonly used to transport mobile homes, do-it-yourself moving vans, and boats. In the construction industry, the single axle trailer is used to transport heavy equipment such as portable power plants, welding rigs, and air compressors. In the usual arrangement, the single axle trailer includes a tongue and a hitching member such as a hitching eye or hitching cup for engagement with a coupling member of a tow truck. The tongue of a small, relatively light trailer can be lifted for attachment to a tow truck by a single operator. However, for larger trailer assemblies, and especially those which are loaded, the weight of the trailer tongue may be more than a single operator can safely handle.

In the construction of single axle trailers which are designed to carry very heavy loads, for example an air compressor trailer assembly which may have a gross weight of 2500 pounds or more, the load is distributed along the longitudinal axis of the trailer so that its center of gravity is shifted forward of the axle in the direction of travel to minimize the "fishtailing" effect as the trailer is towed. In a typical arrangement, the tongue is loaded by approximately ten percent of the gross weight. Attempts by a single operator to lift this load have resulted in back, foot and hand injuries.

Various mechanical hand operated jacks have been successfully used for performing the lifting operation relatively safely. However, because it is necessary to align the hitching member fairly precisely in the lateral direction as well as in the vertical direction with respect to the coupling member of the tow truck, the use of the hand-powered mechanical jack is relatively awkward since lateral positioning cannot be coordinated with the vertical positioning without risk of upsetting the jack.

SUMMARY OF THE INVENTION

The object and general nature of this invention is the provision of new and improved means for assisting an operator in lifting the tongue of a single axle trailer for engagement with the coupling member of a tow truck. In a typical embodiment of the present invention, a portable utility trailer assembly of the type including a frame supported by a single axle and having a tongue projecting from the frame for hook-up to a tow truck is provided with a ground-engaging strut pivotally secured to the tongue and a pneumatic power transducer operably connected between the strut and the tongue to lift the tongue to a position either slightly above or slightly below the proper level for engagement with the coupling member of the tow truck. Since the power transducer is driven by a compressible fluid (compressed air), the position of the tongue may be adjusted by the application of only a few pounds of force, either up or down, depending upon the initial equilibrium position established by the pneumatic power transducer. The incremental aligning force, typically less than 5 percent of the load imposed through the tongue, may be safely and easily applied by a single operator. Since the primary lifting force is applied continuously through the power transducer and strut, the operator may maneuver the tongue laterally as well as vertically without risk of upsetting the primary supporting mechanism. By utilizing a pneumatic power transducer which is driven by a source of compressed air as the primary supporting mechanism, the vertical forces required to align the tongue are relatively small and can be safely and easily applied with precision by a human operator.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIGS. 4 and 5 are isometric views which illustrate how the jack assembly of FIG. 2 may be added to the tongue of an existing trailer assembly; and, FIGS. 6 and 7 are isometric views which illustrate an alternate mounting arrangement for the jack assembly of FIG. 2.

DETAILED DESCRIPTION

Figure 1:
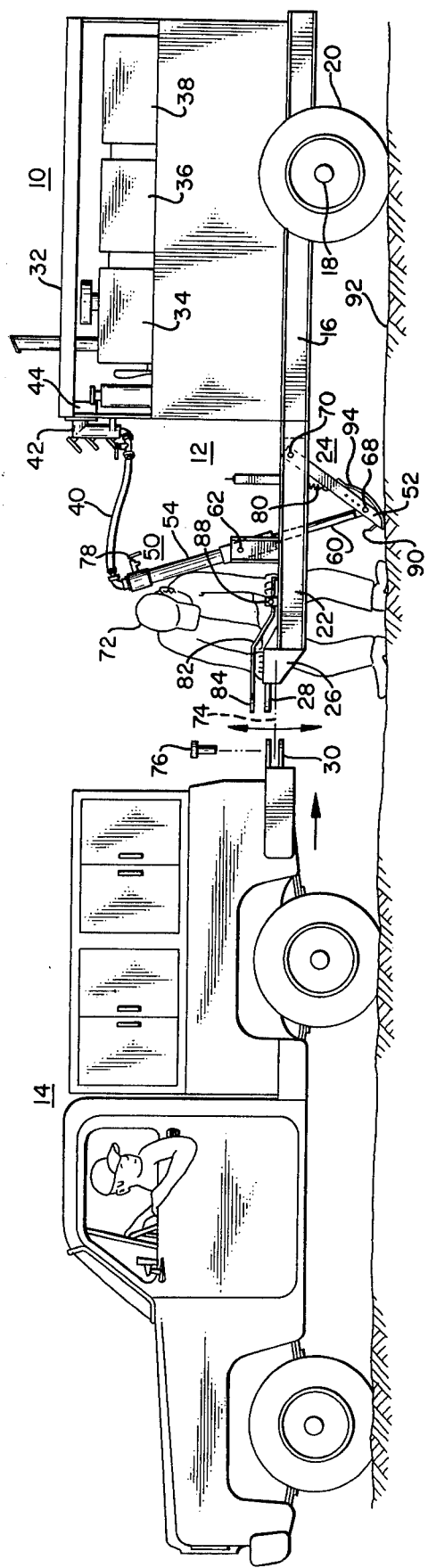
FIG. 1 is a side elevation view of a tow truck and a single axle trailer in which the principles of the invention have been incorporated.

Referring now to FIG. 1 of the drawing, a single axle utility trailer 10 is shown supported by a pneumatic jack assembly 12 in maneuvering position for hook-up to a tow truck 14. The single axle trailer 10 includes a horizontal chassis or frame member 16 supported by conventional spring means (not shown) on an axle 18. The axle 18 is suitably fitted to receive a bearing (not shown) and a wheel 20 to provide support for the axle and trailer for rolling movement over the ground. The forward end of the frame 16 has side members 22 symmetrically disposed about the longitudinal center line of the frame which together define a tongue 24. The side members 22 converge at a hitch 26 which is terminated by a hitching eye 28. The jack assembly 12 is mounted intermediate the side members 22 as shown and discussed in detail hereinafter. The jack assembly 12 is operable to lift the tongue 24 into approximate alignment with a coupling member 30 which is carried by the tow truck 14.

The chassis 16 supports a superstructure 32 which encloses a conventional prime mover 34 such as a gas or diesel engine which is mounted on the forward part of the frame 16 and which provides the motive power for driving a piston air compressor 36 for producing compressed air which may be stored in an air tank 38. The jack assembly 12 is connected to receive compressed air directly from the air compressor 36 or indirectly through the air tank 38 by means of an air hose 40 and a valve assembly 42. A control panel 44 houses the control valves of the valve assembly 42 and the controls necessary to operate the prime mover 34.

The wheel assembly 20 is a conventional arrangement which includes an inner steel wheel and a circumferentially extending pneumatic tire carried on the axle 18. The superstructure 32 is suspended from the axle 18 by a conventional spring suspension (not shown) to provide a smoother ride. For example, the axle 18 can be attached to a suitable lift spring by a clevis and plate with the opposite ends of this lift spring attached in the conventional manner to the underside of the frame 16. Appropriate travel lights and signal lights (not shown) may be secured to the rear of the superstructure 32.

Figure 2:
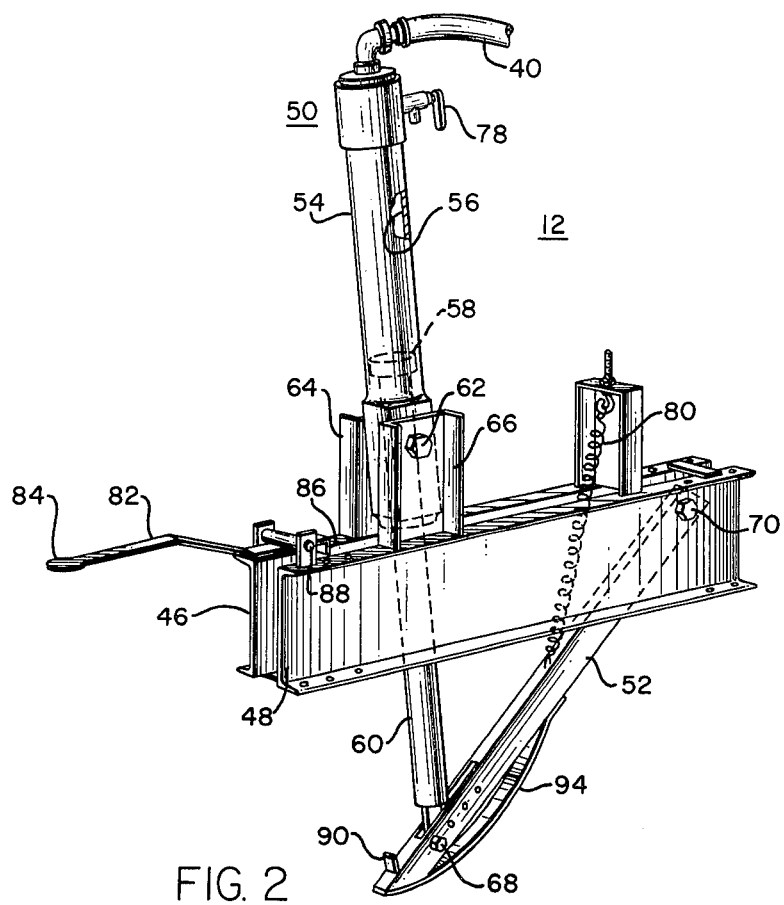
FIG. 2 is an isometric view of the jack assembly shown in FIG. 1.

The details of the jack assembly 12 are illustrated in FIG. 2 of the drawing. The jack is assembled to the tongue 24 by means of a first elongate structural member 46 and a second elongate structural member 48 which are arranged in parallel with each other and are spaced apart to permit rotational movement of a pneumatic power cylinder 50 and a strut 52 in the intervening space. The power cylinder 50 includes a housing member 54 which encloses a pressure chamber 56 which is connected in fluid communication by the air hose 40 to receive compressed air produced by the air compressor 36. A piston 58 is operably coupled for sliding engagement to the interior walls of the pressure chamber 56 to transmit a mechanical force to an actuating arm or extensible rod 60 in response to power derived from the compressed air in the pressure chamber 56. The power cylinder 50 is pivotally secured to the elongate structural members by means of a pair of hinged stubs 62. The stubs 62 are pivotally joined to opposite flange members 64, 66 which are joined by welding or other suitable means to the elongate structural members 46, 48 respectively. The extensible rod 60 is pivotally secured to the strut 52 by means of a hinge pin 68. The opposite end of the strut 52 is pivotally secured to a hinge pin 70 which is supported by the elongate structural members 46, 48. The pivotal mounting arrangement of the power cylinder 50 and the strut 52 with respect to each other and with respect to the elongate structural members 46, 48 permit angular displacement of the power cylinder with respect to the chassis 16 of the trailer as the tongue is lifted. It also permits angular displacement of the power cylinder 50 with respect to the strut 52 as the piston 58 is displaced within the housing 54.

Referring again to FIG. 1 of the drawing, as the pressure chamber 56 is pressurized with compressed air, a lifting force is applied through the extensible rod 60 to the strut 52. As the piston 58 moves within the pressure chamber 56, the strut 52 is angularly displaced with respect to the tongue 24 as the hitch 26 is lifted into approximate alignment with the coupling member 30 of the tow truck 14. An operator 72 opens the valve assembly 42 to admit the flow of compressed air into the pressure chamber 56 of the power cylinder 50 until the tongue 24 is raised to an equilibrium position somewhere within an angular range slightly above or slightly below the center line 74 of the coupling member 30. When an equilibrium position is reached in the general vicinity of the coupling center line, the operator closes off the flow of air to the pressure chamber 56. The trailer assembly 10 is then set up properly so that the operator 72 can maneuver the tongue and hitch laterally as well as vertically to align the hitching eye 28 with the center line 74 of the coupling member 30.

This alignment procedure may be performed easily and safely by the operator 72 in the exercise of his fine motor control when the forces he must overcome are relatively small. For the single axle utility trailer 10 which typically has a gross weight of approximately 2500 pounds, as much as 250 pounds may be distributed through the tongue 24 so that the center of gravity is shifted forward of the axle 18 to minimize unstable lateral oscillations as the trailer assembly is towed. By utilizing the jack assembly 12, substantially all of the load directed through the tongue of the trailer is overcome by the jack assembly so that the operator 72 need only exert a force in the neighborhood of 5 percent of the total load on the tongue in order to maneuver it vertically (either up or down) with respect to the center line 74 of the coupling member 30. Slightly greater force must be exerted by the operator to maneuver the tongue laterally with respect to the center line 74. However, because the jack assembly 12 exerts a continuous force through the ground engaging strut 52, the tongue may be maneuvered laterally as well as vertically without risk of upsetting the primary lifting force.

Figure 3:
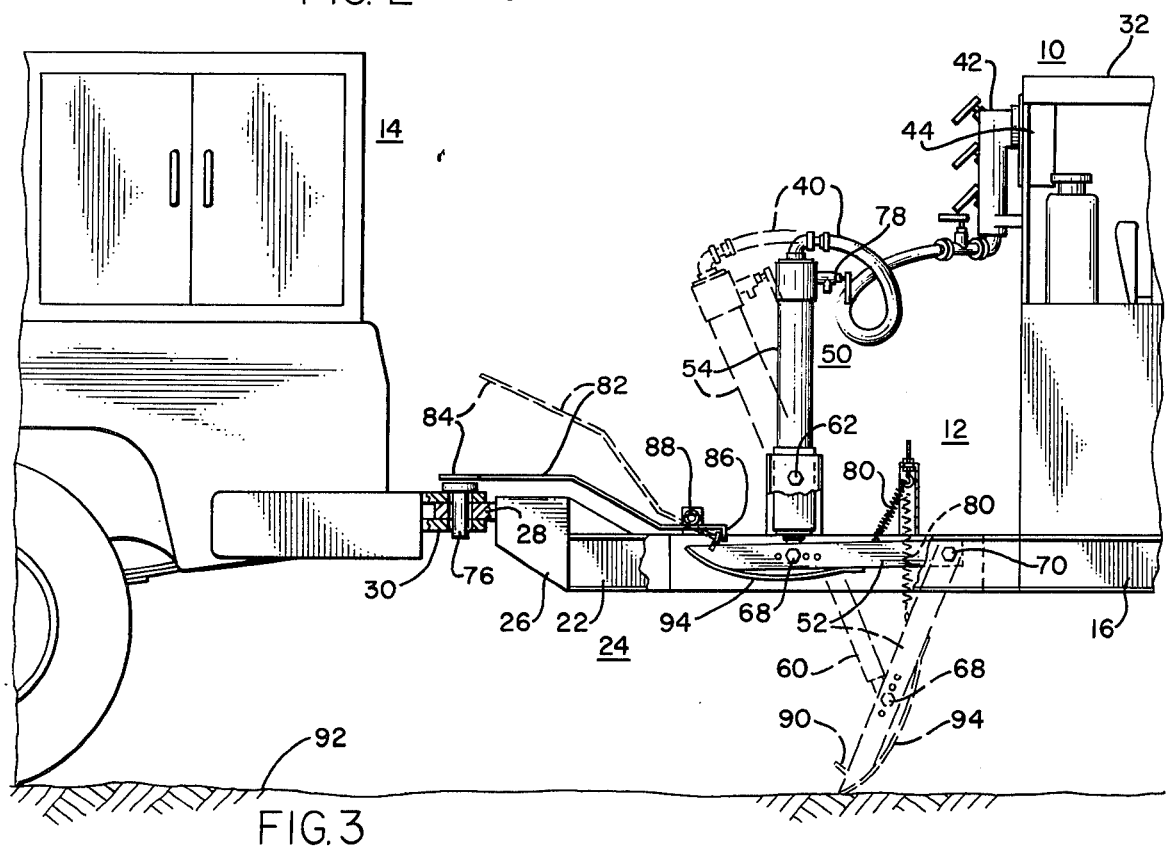
FIG. 3 is a view similar to FIG. 1 which shows the jack assembly in its fully retracted position and the tongue of the trailer in engagement with the tow truck.

After the hitching eye is inserted into the coupling member 30, a coupling pin 76 is inserted in registration with the coupling member 30 and hitching eye 28 as shown in FIG. 3. The strut 52 and the extensible rod 60 are retracted by bleeding off the compressed air contained within the pressure chamber 56 by opening a bleed valve 78 which allows the piston 58 to be retracted within the chamber. A spring 80 is secured intermediate the tongue 24 and the strut 52 to apply a recoiling force to cause the piston and strut to be retracted into the space between the structural members 46, 48 in order to prevent the strut from striking the ground during travel.

According to an important feature of the invention, a latch 82 is provided for confining the coupling pin 76. The latch 82 includes a first end portion 84 for confining the locking pin in registration with the hitch 28 and coupling member 30, and a second end portion 86 for engaging the strut 52 when it is in its fully retracted position as shown in FIG. 3. The latch 82 is pivotally secured to the tongue by pivot pin 88 which allows its first end portion 84 to be rotated away from the coupling pin 76 to permit it to be removed or inserted into the coupling assembly when the strut 52 and the rod 60 are extended. The latch 82 is also rotatable to a second position wherein the coupling pin is confined by the end portion 84 and the end portion 86 is confined or engaged by a tang portion 90 carried by the strut 52. The tang 90 operates to prevent further angular displacement of the latch in the event the coupling pin 76 is subjected to jolting or jarring displacing movements during travel.

It has been observed that the ground engaging end portion of the strut 52 "slips" along the ground supporting surface 92 as the tongue is lifted. A shoe 94 is secured to the underside of the strut 52 for engaging the ground surface 92 to facilitate this slipping motion.

The jack assembly 12 can be conveniently fitted to the tongue of a trailer assembly 10 as illustrated in FIGS. 4 and 5 of the drawing. In those views, the elongate structural members 46 and 48 may be welded or bolted directly to transverse beams 96, 98 with the strut 52 and extensible rod 60 projecting between and beneath the side members 22 which form the tongue 24. This arrangement is particularly convenient when it is desired to incorporate the jack assembly 12 into an existing trailer assembly. For example, it may be desirable to add the pneumatic jack assembly 12 to a single axle trailer which supports a mobile home. In such an installation, an auxiliary compressed air source must be provided to energize the power cylinder 50.

A more compact arrangement is provided if the jack assembly 12 is formed as an integral part of the tongue 24 during the manufacture of the trailer assembly. Such an arrangement is illustrated in FIGS. 6 and 7 of the drawing.

Operation of the pneumatic jack assembly 12 will be more fully understood from the following description of operation. If it is desired to transport the utility trailer assembly 10 from a storage location to a construction site, the power cylinder 50 is energized by means of compressed air stored in the air tank 38. A mechanical force proportional to the pressure of the compressed air contained in the pressure chamber 56 drives the extensible rod 60 and strut 52 into engagement with the ground surface 94 and the tongue 24 is lifted to an equilibrium position either above or below the center line 74 of the coupling member 30. At this point the operator 72 closes off the flow of compressed air and maneuvers the tongue 24 and hitch 26 vertically and laterally until the hitching eye 28 is substantially aligned with the center line 74 of the coupling member 30. After the hitching eye 28 is engaged in the coupling member 30, the coupling pin 76 is inserted and the latch 82 is rotated down over the coupling pin to restrict vertical movement. The operator then opens the bleed valve 78 to discharge the compressed air whereupon the spring 80 pulls the strut and piston into the fully retracted position as shown in FIG. 3 of the drawing. In this position, the strut confines the opposite end 86 of the latch 82 which locks the coupling pin in place. After the construction site is reached, the operator again pressurizes the power cylinder 50 with compressed air stored in the air tank until the strut 52 engages the ground and exerts a lifting force on the coupling member 30. At this point, the operator rotates the latch 82 and removes the coupling pin 76. After the tow truck 14 pulls away, the operator increases or decreases the pressure of the compressed air in the power cylinder until the chassis 16 is level with the ground. Since the prime mover 34 may be either a gasoline or diesel powered engine, it is important that it be maintained in a level position during operation for proper lubrication. Accordingly, the valve assembly 42 is closed leaving the power cylinder 50 energized with the extensible rod 60 and strut 52 extended to provide support for the utility trailer assembly 10 during use of the air compressor 36 for energizing a jack hammer or other pneumatic power apparatus.

Although variations in sizes may be employed according to the particular trailer assembly used, a 2-inch diameter piston 58 having a 20-inch stroke is satisfactory. Other diameter and stroke specifications may be employed to good advantage. However, it is essential that a compressible fluid such as air be utilized as the motive fluid. A relatively incompressible fluid, such as hydraulic fluid, is unsuitable and cannot be used to implement the invention. Any convenient source of compressed air, such as a rechargeable cylinder of compressed air, may be used in the place of an air compressor assembly for those trailer applications in which an air compressor or other source of compressed air is not normally provided.

Although a particular embodiment of the invention has been shown and described for the purpose of illustration, it will be apparent that other embodiments and modifications are possible without departing from the scope of the invention as defined by the appended claims.

What is claimed is:

1. In a portable trailer assembly of the type including a frame supported by a single axle and having a tongue projecting from the frame for hookup to a tow truck, the combination with the trailer assembly of a pneumatic jack assembly and a source of compressed air operably connected thereto for assisting an operator in lifting the tongue to engage a hitch receptacle on the tow truck, the jack assembly including a ground engaging strut pivotally secured to the tongue, a pneumatic power transducer having a pressure chamber connected to receive compressed air from the compressed air source and an actuating arm operably coupled to the pressure chamber for transmitting a mechanical force in response to power derived from the compressed air in the pressure chamber, the power transducer being pivotally secured to the tongue and the actuating arm being pivotally secured to the strut to permit rotational movement of the power transducer and tongue relative to each other and relative to the strut as the tongue is lifted by the force exerted by the power transducer through the actuating arm.

2. A trailer assembly comprising:
 an axle having fittings for receiving bearings and wheels for rolling movement over the ground;
 a chassis disposed on the axle, the chassis including a tongue for attachment to a tow truck for transporting the trailer assembly;
 a strut pivotally secured to the tongue having a length sufficient to permit an end portion of the strut to engage the ground as the tongue is lifted for attachment to the tow truck; and
 a cylinder assembly having a housing for receiving compressed air and a piston movable along the axis of the cylinder in response to pressure exerted by compressed air contained in the cylinder, the housing being pivotally secured to the tongue to permit angular displacement of the cylinder with respect to the chassis, and the piston being pivotally secured to the strut to permit angular displacement of the cylinder with respect to the strut as the position is displaced within the housing.

3. In a portable air compressor assembly of the type transported on a single axle trailer, the assembly including an air compressor disposed on a load bearing frame having a tongue and a hitch for engagement with the coupling member of a tow truck, the combination with the frame of a pneumatic jack assembly for assisting an operator in lifting the tongue and aligning the hitch with the coupling member, the jack assembly including (a) a strut having an end portion pivotally secured to the frame and having an opposite end portion for engaging the surface upon which the trailer rests, and (b) pneumatic power means having a cylinder connected to receive compressed air from the air compressor and a piston operably disposed for displacement within the cylinder for transmitting a mechanical force proportional to the pressure of the compressed air contained by the cylinder, the cylinder being pivotally secured to the frame and the piston being pivotally secured to the strut whereby the frame is angularly displaced about the pivotal axis of the axle as the strut is forced into engagement with the surface upon which the trailer rests by the piston as it is extended in response to an increase in the pressure of the compressed air contained in the cylinder.

4. A jack assemby for lifting the tongue of a trailer comprising, in combination:
 a frame for attachment to the tongue of the trailer;

a strut having a first end portion pivotally secured to the frame and having a second end portion for engaging the surface upon which the trailer rests as the tongue is lifted; and, a cylinder having a chamber for receiving pressurized, compressible fluid and a piston operably disposed within the chamber for transmitting a mechanical force proportional to the pressure of the fluid contained therein, the cylinder being pivotally secured to the frame and the piston being pivotally secured to the strut whereby the cylinder and strut are displaced angularly with respect to the frame as the piston is displaced within the cylinder.

5. The combination as defined in claim 4 wherein the frame comprises first and second elongate structural members secured together in parallel spaced relation, the cylinder and strut being disposed between the two structural members with their pivotal axes disposed substantially perpendicular to the longitudinal axis of the frame, the piston and strut projecting beneath the frame as the piston is extended, and the strut being rotated into the space between the structural members as the piston is retracted.

6. In combination:

a single axle trailer havig a load bearing frame and a tongue for attachment to a tow truck, a tank of compressed air carried by the trailer;

a ground engaging strut pivotally secured to the tongue; and, a linear actuator operable to develop a mechanical force from fluid power derived from the tank of compressed air, the linear actuator including a housing having a pressure chamber and an extensible piston disposed in the chamber, the chamber being connected in fluid communication with the tank of compressed air, the housing being pivotally secured to the tongue, and the piston being pivotally secured to the strut, whereby the linear actuator and the ground engaging strut cooperate to lift the tongue as the chamber is pressurized.

7. In a portable utility trailer assembly of the type including a frame supported by a single axle and having a tongue assembly including a hitch and coupling pin projecting from the frame for hookup to a tow truck, the combination with the trailer assembly of:

a pneumatic jack assembly and a source of compressed air operably connected thereto for assisting an operator in lifting the tongue to engage a hitch receptacle on the tow truck, the jack assembly including a ground engaging strut pivotally secured to the tongue, a pneumatic power transducer having a pressure chamber connected to receive compressed air from the compressed air source and an actuating arm operably coupled to the pressure chamber for transmitting a mechanical force in response to power derived from the compressed air in the pressure chamber, the power transducer being pivotally secured to the tongue and the actuating arm being pivotally secured to the strut to permit rotational movement of the power transducer and tongue relative to each other and relative to the strut as the tongue is lifted by the force exerted by the power transducer through the actuating arm;

a spring having an end portion secured to the tongue and an opposite end portion secured to the strut, the spring being stretched by the movement of the tongue relative to the strut when the actuating arm is extended, the stretched spring applying a recoiling force to retract the strut and actuating arm when the pressure chamber is de-energized; and, a latch having a first end portion for confining the coupling pin in registration with the hitch and coupling member and having a second end portion for engaging the strut, the latch being pivotally secured to the tongue and rotatable to a first position to permit access to the coupling pin when the strut and actuating arm are extended, and being rotatable to a second position wherein the coupling pin is confined by the first end portion and the second end portion is confined by the strut when the strut and actuating arm are fully retracted.

8. A jack assembly for lifting the tongue of a trailer comprising, in combination:

a frame for attachment to the tongue of the trailer;

a strut having a first end portion pivotally secured to the frame and having a second end portion for engaging the surface upon which the trailer rests as the tongue is lifted;

a cylinder having a chamber for receiving pressurized fluid and a piston operably disposed within the chamber for transmitting a mechanical force proportional to the pressure of the fluid contained therein, the cylinder being pivotally secured to the frame and the piston being pivotally secured to the strut whereby the cylinder and strut are displaced angularly with respect to the frame as the piston is displaced within the cylinder;

a spring having a first end portion secured to the frame and having a second end portion secured to the strut for retracting the strut and piston when the cylinder is de-energized; and, wherein the trailer tongue includes a hitch for engagement with the coupling receiver of a tow truck and a coupling pin is provided for insertion into the hitch and coupling receiver, the jack assembly further including a latch pivotally secured to the frame, the latch having a first end portion for confining the coupling pin and a second end portion for engaging the strut, the latch being rotatable to a first position to permit access to the hitch when the piston and strut are extended, and the latch being rotatable to a second position wherein the first end portion of the latch is disposed over the hitch to confine the coupling pin as it is disposed within the hitch and coupling receiver and the second end portion of the latch is engaged by the strut when the piston and strut are fully retracted.

* * * * *

UNITED STATES PATENT OFFICE
CERTIFICATE OF CORRECTION

Patent No. 4,113,274  Dated September 12, 1978

Inventor(s) Oscar Oswald Vahrenkamp

It is certified that error appears in the above-identified patent and that said Letters Patent are hereby corrected as shown below:

Column 6, line 1, after "portable", insert —utility—.

Signed and Sealed this

Seventeenth Day of April 1979

[SEAL]

Attest:

RUTH C. MASON
Attesting Officer

DONALD W. BANNER
Commissioner of Patents and Trademarks